(12) United States Patent
Höbel

(10) Patent No.: US 8,656,576 B2
(45) Date of Patent: Feb. 25, 2014

(54) MACHINING UNIT

(75) Inventor: Alfred J. Höbel, Lauben (DE)

(73) Assignee: Grob-Werke GmbH & Co. KG, Mindelheim (DE)

( * ) Notice: Subject to any disclaimer, the term of this patent is extended or adjusted under 35 U.S.C. 154(b) by 1128 days.

(21) Appl. No.: 12/585,723

(22) Filed: Sep. 23, 2009

(65) Prior Publication Data

US 2010/0072688 A1    Mar. 25, 2010

(30) Foreign Application Priority Data

Sep. 23, 2008 (DE) .......................... 10 2008 048 571

(51) Int. Cl.
*B23Q 7/00* (2006.01)
*B23Q 11/08* (2006.01)

(52) U.S. Cl.
USPC ........................................... 29/563; 409/134

(58) Field of Classification Search
USPC ....... 269/21, 903, 289 R, 900; 29/281.1, 563, 29/33 P, DIG. 56, DIG. 94; 451/285–288; 409/134, 164; 408/241 G; 198/345.3, 198/346.1; 414/292
See application file for complete search history.

(56) References Cited

U.S. PATENT DOCUMENTS

| | | | | |
|---|---|---|---|---|
| 4,999,895 A | * | 3/1991 | Hirose et al. .................... | 29/33 P |
| 5,342,156 A | * | 8/1994 | Baba .............................. | 409/134 |
| 5,364,210 A | * | 11/1994 | Rutschle et al. ............... | 409/134 |
| 5,531,004 A | * | 7/1996 | Ahn ................................ | 29/33 P |
| 5,658,105 A | * | 8/1997 | Takahashi ...................... | 409/134 |
| 6,176,656 B1 | * | 1/2001 | Seong ............................ | 409/134 |
| 7,108,647 B2 | * | 9/2006 | Nakazawa et al. ............. | 483/14 |
| 7,306,509 B2 | * | 12/2007 | Hoshino ........................ | 451/41 |
| 8,028,978 B2 | * | 10/2011 | Nelson et al. ................. | 118/728 |
| 2006/0270540 A1 | * | 11/2006 | Takayama et al. ............. | 483/41 |

FOREIGN PATENT DOCUMENTS

| | | |
|---|---|---|
| DE | 196 230 080 | 2/1998 |
| DE | 197 36 252 | 3/1999 |
| DE | 20 2004 020 485 | 10/2005 |
| EP | 0 553 849 | 8/1993 |
| JP | 54 025581 | 2/1979 |
| JP | 3-135155 | 2/2001 |

OTHER PUBLICATIONS

European Search Report dated Jan. 22, 2010).
German Search Report dated Oct. 8, 2008.

* cited by examiner

*Primary Examiner* — Lee D Wilson
*Assistant Examiner* — Nirvana Deonauth
(74) *Attorney, Agent, or Firm* — Jacobson Holman PLLC

(57) ABSTRACT

A machining unit with a work piece changing unit. The work piece changing unit has a cover which can swivel around a rotational axis, and opens and closes the working room of the machining unit for work piece changing processes. The work piece changing unit has at least two lifting and lowering work piece carriers separated by the cover. The work piece carrier remains in the working room during the machining by the machining unit.

12 Claims, 2 Drawing Sheets

MACHINING UNIT

Figure 1:
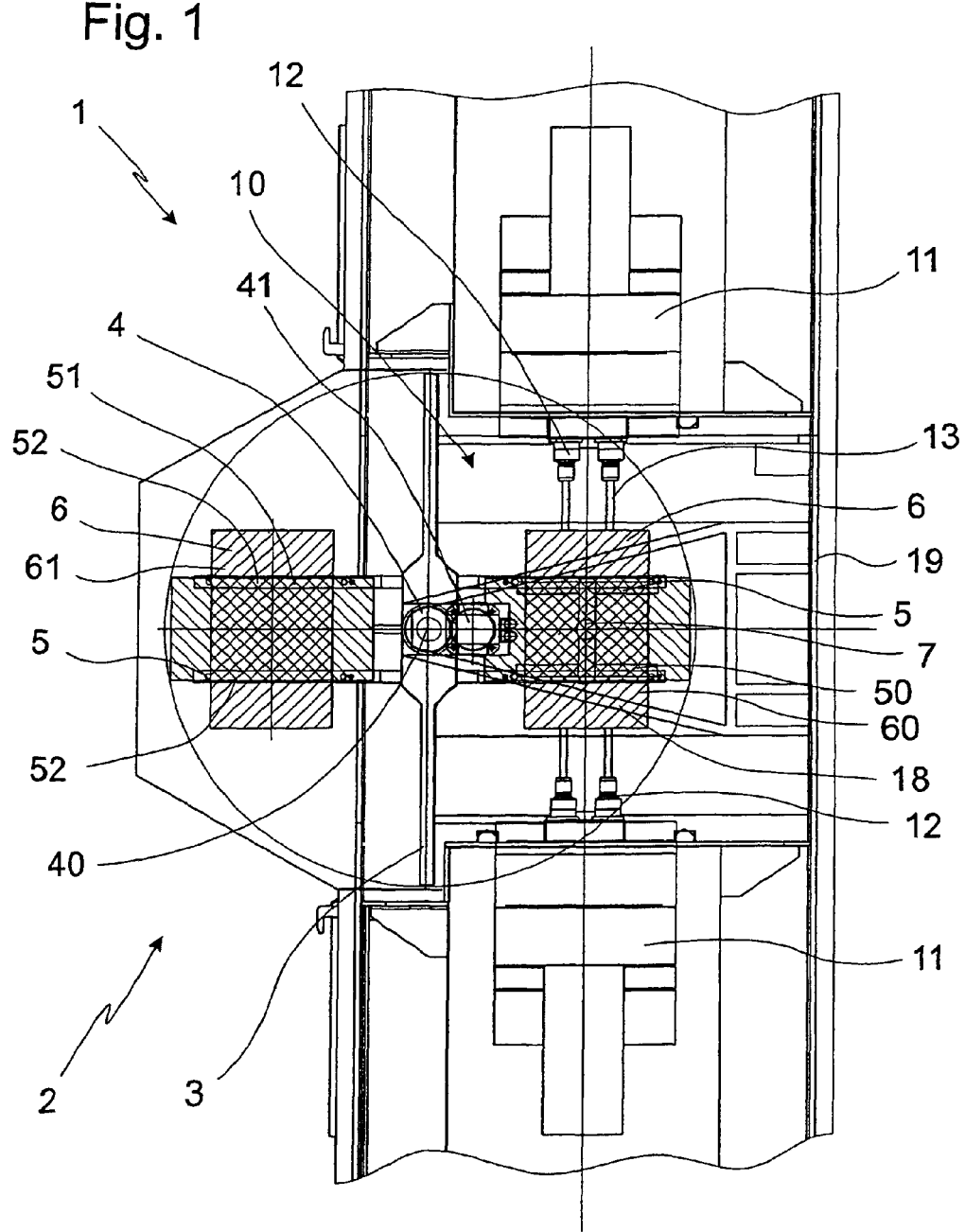

The invention refers to a machining unit with a work piece changing unit.

BACKGROUND OF THE INVENTION

A comparable machining unit is known, for example, from the German specification 100 53 804. In this document a work piece changing device is described in which a rotational axis set on a linear axis is designed with a fetching gripper and a bringing gripper, and the work piece change is carried out above the rotational axis by simultaneous swivelling in and out of the unfinished or finished work piece. The gripper grips here the work piece each time from above, that means the work piece is suspended on the gripping device. The gripper couples during the lowering movement in a cover or a dividing wall, and thus transports the work piece in or out of the working room. The gripper, however, has to be pulled out of the working room during machining, for which purpose a door is provided above the work piece.

The changing process takes rather long as after finishing the machining first of all the door has to be opened, then the gripper is lowered, the work piece is gripped and then lifted. Then the rotation is following which gets the work piece out of the working room and conveys the new work piece in. The work piece, on the other hand, has then to be put down, released and then the gripper has to shift the new work piece so far upwards that the supply door can be closed again.

DE 196 23 080 C1 shows a machine tool with a pallet changing device designed as rotational changing device for changing pallets between the machining position and the waiting position. The pallet changing device can be decoupled here from the pallet in the working station and can be moved in a release position.

DE 197 36 252 A1 shows a pallet changing device with at least two pallets which can be brought from a transfer position in a machining position, at least the pallet of the pallet changing device in the machining position being surrounded by a circumference wall.

DE 20 2004 020 485 U1 shows a pallet changing device with more than two work piece receivers which are separated from each other by covers in the way of a revolving door.

Machining units described in the beginning are used with highly automated machining lines. For an efficiency of the machining units as high as possible the changing process has to be carried out as fast as possible.

Short Abstract of the Invention

Therefore it is an object of the present invention to suggest a machining unit where the work piece changing process is carried out as fast as possible.

This problem is solved with a machining unit with a work piece changing unit wherein the work piece changing unit has a cover rotating around a rotational axis, opening and closing the working room of the machining unit for work piece changing processes, and the work piece changing unit has at least two work piece carriers separated by the cover, which can be lifted and lowered, and which each is able to carry at least one work piece. A work piece carrier remains during machining by the machining unit in the working room, and the work piece is supported by this work piece carrier.

In the working room a clamping unit acting on the work piece is provided in the concept according to the invention. This clamping unit is arranged on a crosshead traversing the working room.

The machining unit according to the invention is characterised in contrast to the devices known from the state of the art by saving time through it which is required in the known devices to guide the work piece gripper out of the working room after the work piece has been deposited and a supply door has been closed. This required time occurs double as for removing the work piece out of the working room again the reversed process is required. By a suitable design of the work piece carrier this is realised space-saving as well as stable and does not interfere with the machining as it remains below the work piece. A multilateral machining, in particular a machining from above is guaranteed. According to the invention it is also provided that a work piece carrier is also able to carry several work pieces so that the efficiency of a machining unit according to the invention is increased further. The suggestion according to the invention achieves already a considerable increase in efficiency as the machining breaks during the work piece change are reduced considerably by the suggestion according to the invention. According to a rough estimation the work piece changing time is reduced by about 30% to 40%.

The work piece carriers designed lifting and lowering make it possible that the work piece carriers lift or lower and deposit the work piece at the supply spot in front of the working room or in the supporting spot in the working room. According to the invention a number of modifications is provided how this lifting or lowering movement of the work piece carriers is realised.

The suggestion according to the invention that the work piece carrier carries the work piece, that is supports it from below or the lower area, has in particular the advantage that for the connection of the work piece with the work piece carrier for transport purposes no or only a little space is required at the work piece. In the known gripping concepts the gripper has to grip the work piece from above and thus covers a certain area of the work piece where therefore a machining, even if the gripper remains in the working room, is not possible. This restricts the field of use of such concepts considerably. In contrast to that the suggestion according to the invention uses anyway the fact that the work piece is machined supported on a support, and in this area a machining cannot be carried out either, so that here also the connection between the work piece and the work piece carrier is made for transport purposes.

In a preferred embodiment of the invention it is provided that the work piece carrier carries the work piece directly, without a supporting pallet or the like. For the transport of the work pieces often suitable devices such as supporting pallets, pallets or the like are known. The use of such supporting pallets is intentionally done without in the solution according to the invention as these are not necessary for carrying out the concept according to the invention. By means of that, however, also a very economical machining is provided as the supporting pallets are not required and the corresponding costs do not arise.

In a preferred embodiment of the invention a pivoting column is provided around which the cover is supported on bearings rotating. As it is shown in particular in the drawing, the cover is provided as revolving door, the pivoting column being arranged in the center, symmetrically at the cover in order to guarantee an optimal closed condition when the cover is swivelled. Here the pivoting column is orientated preferably vertically, however, not restricted to it according to the invention. Of course, it can be arranged orientated in any way in the room. The pivoting column contains the rotational axis around which the cover is supported on bearings rotating.

Furthermore it is provided according to the invention that in the working room a supporting spot determined (defined) by index points is provided for the work piece, and the work piece carrier deposits the work piece to be machined on the supporting spot. The index points take care of an exact alignment and positioning of the work piece in the machining unit as, as a rule, very precise machinings have to be carried out on the work piece. Here the arrangement of the index points has to be chosen in such a way that a self-alignment is carried out, for example by cones or the like, so that conveniently the effort for a highly precise positioning of the work piece can be chosen in a lower grade by the work piece changing unit suggested according to the invention, which saves expenses.

The work piece has here corresponding contact points interacting in a suitable way with the index points and achieving the highly precise positioning during machining.

In the machining unit according to the invention a clamping unit for clamping the work piece is provided. The clamping unit has the task of holding the exactly positioned work piece during the machining process safely and in the exact position. It has to be taken into consideration here that during machining considerable machining forces can act on the work piece. For the design of the clamping unit a number of solutions are known in the state of the art. Thus, for example, suitable clamping units are integrated in the index points, or suitable fastening claws pull the base of the work piece down. In an embodiment according to the invention it is provided that in the working room above the work piece a clamping unit acting on the work piece is provided. This concept has several advantages. On the one hand, the clamping unit does not interfere with the change or exchange process of the work piece, claws provided at the base of the work piece have to be moved away accordingly reliably in order to remove the work piece from the support spot. A certain lifting or lowering movement, that is a vertical movement of the work piece, may be provided, however, this is sufficiently small so that the clamping device acting from above is not interfered with in any way. In particular the clamping unit does not have to compete with a gripping device supplying the work piece from above in regard of space, which leads to corresponding labours in construction. Rather it is possible to realise a rigid and therefore mechanically very stable clamping unit which pushes, for example by means of a clamping stamp, the work piece to the index points of the supporting spot.

In an embodiment according to the invention it is furthermore provided that the crosshead is supported on the pivoting column. Because of the construction the pivoting column is in the symmetric center of the work piece movement. In an arrangement where two work piece carriers are provided the rotational axis is between the supporting spot in the working room and the rigging spot outside the working room. In the area of the cover additionally supports are interfering as the cover has to swivel through this room during the change and exchange process of the work piece. Therefore in this area a close support of the clamping unit cannot be carried out, rather large clamping widths would be necessary which would lead to corresponding bending moments in the crossheads. The employment of the pivoting column as support for the crosshead avoids these problems in a very elegant manner. The pivoting column itself is a stable part of the machine frame, the cover is supported on bearings rotating at the pivoting column. The pivoting column is also rather close to the supporting spot, so that the lengths which have to be traversed are very short, and the pivoting column gains another aspect by this employment. The pivoting column is thus important not only during the work piece change process, but also during machining, as this then supports the clamping unit. The result is a good static concept with low material input. Besides the support point of the crosshead at the pivoting column the crosshead is supports in a suitable way on the side of the working room opposite the cover in the machine frame.

In a modification according to the invention it is provided that the work piece carrier is held by the cover. Such a design can be produced simply, alternatively to that it is possible that work piece carrier and cover are supported on bearings independently from each other, each individually rotating around the rotational axis, in particular at the pivoting column.

As already described in the beginning several modifications are possible for realising the lifting/lowering device. Therefore in a modification according to the invention it is, first of all, provided that at the pivoting column a lifting/lowering device is provided for the cover. The lifting/lowering movement has to be carried out by the work piece carrier to effect lifting and lowering of the work piece on its respective support. If such a modification is chosen it is convenient that the work piece carrier is arranged at the cover. It is convenient here to use the lifting/lowering movement of the cover additionally also for a machine housing as sealed as possible. By means of the lowering movement of the cover this gets into a suitable seal seat and reaches a sealing of the working room, where often also coolants and so on are used, as sealed as possible. Before swivelling in or out the cover with the work piece carrier is lifted in order to lift the respective work piece, and, at the same time, also the cover is cleverly lifted out of its sealing position. Thus the lifting and also the lowering movement are used twice.

In a preferred embodiment of the invention a cover tapering conical downwards (along the lowering movement) is suggested. The effect of this design is that during a vertical lifting of the cover, which is required for lifting the work piece, also the lateral seal of the cover with the respective sealing surfaces on the machine housing is released, and then, without destroying anything, a rotating movement can be carried out. In the following lowering movement then not only the work piece is deposited on the work piece carrier but also the edges of the cover equipped with suitable seals seal the cover towards the machine housing.

Alternatively to this it is also possible that the cover has a lifting and lowering device for the work piece carrier. In this case the cover itself is not lifted, however, it carries a suitable lifting/lowering device. As lifting or lowering devices known actuators, driven for example electrically, hydraulically and pneumatically, such as working cylinders or actuating drives and so on, or NC axes are provided.

In another embodiment of the invention it is provided that the work piece changing unit has two, three, four or more work piece carriers each separated by a cover. In the simplest embodiment of the concept according to the invention a plate-like cover, which is, as a rule, flat, is provided between two work piece carriers. This design is also shown in the drawing. The result is that for a change of the work piece a rotating movement of 180° is necessary. The concept according to the invention, however, makes it also possible that the work piece changing unit has three, four or more work piece carriers in order to realise for example a carousel-like machining unit where several different machining tools carry out different machinings on the work piece. Such a design has the advantage that the rotating path, that is the rotating angle between the single machining positions is smaller and therefore the transport is carried out faster.

Usually a cover will be designed rather complex, for example star-like or angled, on order to separate the single work piece carriers from one another. The individual segments, however, have the same size in order to effect a defined and safe partition wall, in particular with the machine housing in the supplying area, in order not to endanger the service person. For the design of the work piece carrier provided according to the invention also several modifications are possible. The work piece carrier arranged at the cover or the work piece changing unit is designed, for example, plate-like or tray-like. However, it turned out convenient for the work piece carrier to be designed in particular fork-like in such a way that between the prongs of the fork-like work piece carrier, for example, index points or other supports arranged on the floor in the working room can extend through in order to carry the work piece deposited here.

The design of the work piece carrier can here not be restricted to the fork-like modification consisting of two prongs; there are a number of other modifications which are realised for example with three prongs or comb-like and so on. As it is provided according to the invention that the work piece carrier remains in the working room during machining, also concepts are comprised by the invention where, for example, the work piece is supported on laterally engaging index points which are, for example, angled against the work piece.

It is an aspect of the invention that the lifting or lowering movement of the single work piece carriers is carried out at the same time for all work piece carriers. This reduces the corresponding effort for the lifting/lowering device. Of course, this does not exclude a suitable individual design of the lifting/lowering mechanism for the individual work piece carriers according to the invention, however, it is connected with slightly more labour.

In a preferred embodiment of the invention it is provided that during the lifting movement of the work piece carrier this lifts the finished work piece from the supporting spot, and a following rotation movement moves the finished work piece around the rotational axis out of the working room, and moves an unfinished work piece supported by another work piece carrier in the working room which gets to the supporting spot by the following lowering movement of the work piece carrier. The process of changing the work piece according to the invention is carried out very fast and contributes to the increasing of efficiency of the machining unit according to the invention. An advantage of the invention is in particular that the work piece carrier is arranged at any time below the respective work piece and, in particular, must not be removed from the working room during machining, so that a considerable advantage in speed is reached.

The invention is furthermore characterised in that during the lifting movement of the work piece carrier this lifts a work piece which has to be machined newly from a conveying means located outside the working room. At the same time the invention provides not only a considerable reduction of the work piece changing times, but can be interlinked in a simple way with other machining units, for example as part of a machining line and so on with suitable conveying means. Therefore the invention can be employed without any problems in transfer lines or machining lines as well as also in individual machining stations where the work piece is put manually on the work piece carrier arranged outside.

An advantageous development of the machining unit according to the invention provides that the machining tool is arranged moving with regard to the work piece. For that it is provided that the machining tool can shift through the turning circle of the work piece carrier. By means of this design of the machining unit another even more simplified machining possibility for the work piece is created. Instead of the already described as laborious and time-consuming moving of carrier or gripper tools now only a rather short path is traveled by the machining tools so that they can be brought out of the machining position particularly fast. This can be carried out directly before swivelling or rotating the work piece carrier. By moving the machining tool through the turning circle of the work piece carrier no other lifting or moving devices are necessary for the tool. By means of this embodiment the machining unit according to the invention it is nevertheless avoided that collisions occur between the machining tools and the work piece or the work piece carrier. Before or after the machining the machining tools are, first of all, brought in a rest position outside the swivelling or turning circle of the work piece carrier, and, after depositing the work piece, for example on a supporting spot in front of a machining unit shifted to the work piece or moved towards it.

In a basic embodiment of the machining unit only one machining tool is provided. An advantageous development of the machining unit of the present invention provides that two or more machining tools are provided. This development of the machining unit makes, for example, a multilateral machining of the work piece possible, or a machining with different tools one after the other or at the same time.

It is seen as convenient if the machining tools, in particular if two or more of them are used, are designed moving relatively to the work piece independently from each other. The machining process is further shortened by this embodiment of the machining unit and the efficiency of the unit is thus improved considerably. In order to be able to carry out a machining of the upper and the lower surface of the work piece a development of the invention provides that the machining tools or the machining tool are/is designed in such a way that they/it can swivel relatively to the work piece. Depending on the supporting spot for the work piece or its embodiment or even the work piece carrier remaining in the working room after machining it becomes possible that the machining tool approaches the work piece from below or above to carry out machinings here. Besides a machining of the upper or lower surface of the work piece the determined swivelling of the machining tool also improves a multilateral machining of the work piece. Furthermore, by the fact that, if necessary, only one machining tool has to provided for several sides of the work piece, the construction of the machining unit is considerably simplified, and thus also the production costs for the machining unit are reduced considerably.

Owing to the fact that the work piece carrier can be brought solely by the rotating movement of the rotational axis of the machining unit to a supporting spot or a machining position in the area of the machining unit the result is that no further guidance to a machining tool is provided. Because of that it is seen as advantageous if for a fast and precise machining of the work piece the machining tool or its carrier have altogether three degrees of freedom of movement. This means that besides a shifting in X- or Y-direction it is also provided that the machining tool can shift in Z-direction and thus in the direction towards the work piece. The corresponding shifting of the machining tool is reached via additional spindle drives engaging at the machining tool or the holding device provided for it. A control of the different drives is here done by a control program or a suitable software provided for the machining unit.

The invention comprises aspects of device as well as of methods. Therefore the invention refers also to a method for carrying out a work piece changing process where during the lifting movement of the work piece carrier it lifts the finished work piece from the supporting spot. By means of the work piece carrier by a subsequent rotating movement the finished work piece is moved out of the working room around a rotational axis. An unfinished work piece supported by the other work piece carrier is moved in the working room and deposited by the subsequent lowering movement of the work piece carrier on the supporting spot.

BRIEF DESCRIPTION OF THE DIFFERENT VIEWS OF THE DRAWINGS

In the drawing the invention is shown schematically. In the drawings:

FIG. 1 a top view of the machining unit according to the invention and

Figure 2:
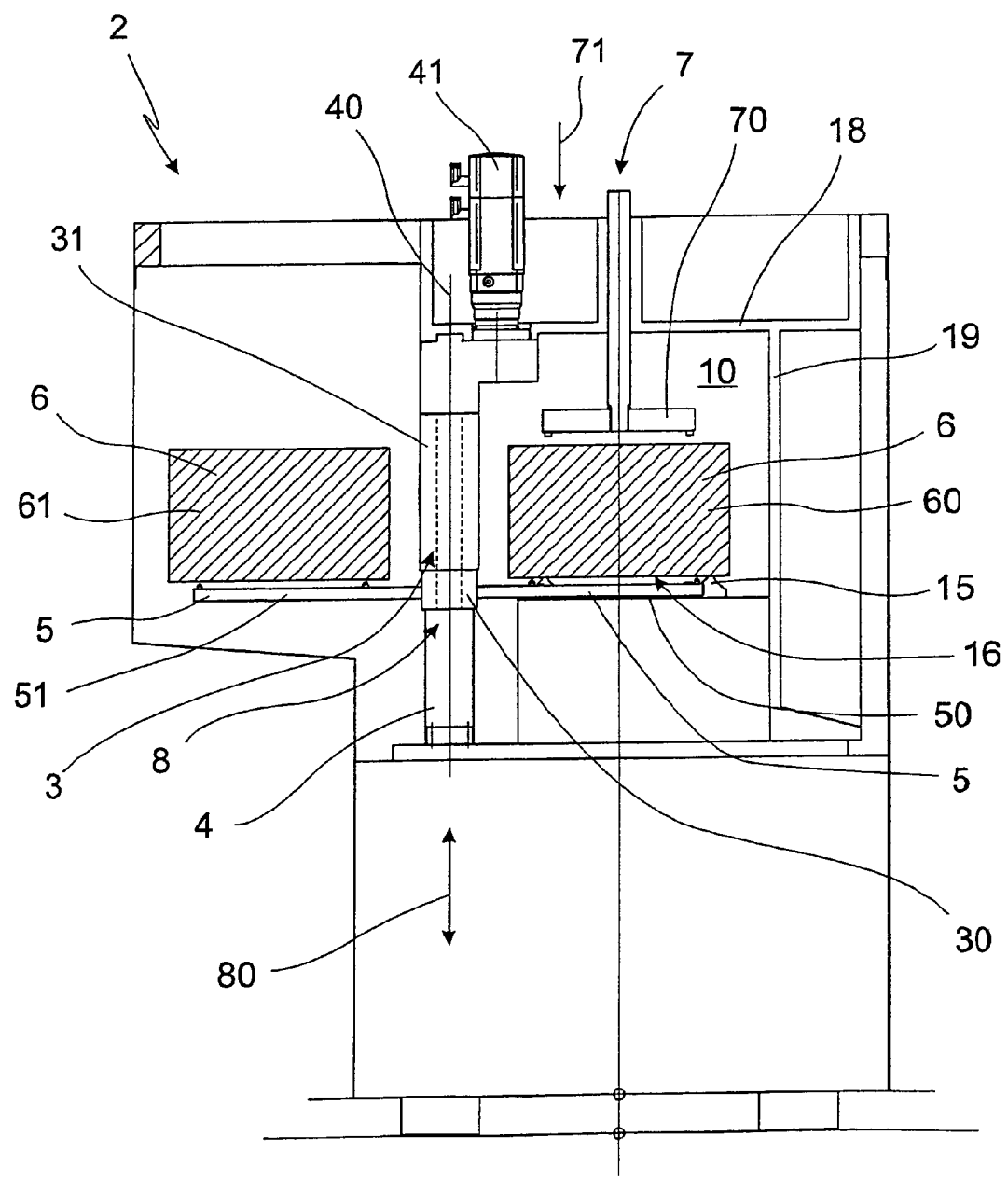

FIG. 2 a vertical section through a machining unit according to the invention;

DETAILED DESCRIPTION OF THE PREFERRED EMBODIMENT

In FIG. 1 the machining unit 1 according to the invention is shown schematically in a top view. The machining unit 1 comprises two opposing machine tools 11 each of which having in the example shown here two working spindles 12. The working spindles 12 drive machining tools 13 rotating. The working room 10 extends between the two machine tools 1 and receives the work piece 6. For safety and soiling reasons the working room 10 is sealed as closely as possible, in particular during the machining times of the machining unit 1. For that purpose a suitable housing not described in detail is provided. Part of this housing is the cover 3 which is also part of the work piece changing unit 2 suggested according to the invention.

In the example shown here the work piece 60 is inside the working room between the two machine tools 11, in particular between the two machining tools each driven by the working spindles 12. This simultaneous, multilateral machining is an aspect of the invention. However, the invention can also be realised in the same way with simpler machining units 1, that is those which have only on one side a machining tool 11 acting on the work piece 6.

It is also possible that the machine tools 11 can shift axially to the working spindles 12. After finishing the machining of the work piece 60 the machine tools 11 are shifted away from the work piece 60 and leave the area of the turning circle of the work piece carrier 5. If shifting machine tools 11 are employed—of course it is also possible that only the machining tools 13 are shifted—depositing of the work piece 60 in the working room can be deleted as the machining tools 13 will be moved towards it only after positioning the work piece 60 in order to machine it. Besides this movement of the machining tools 13 or the machine tools 11 in Z-direction they can also be designed shifting in X- and Y-direction so that several positions on the surfaces of the work piece 60 facing the machining tools 13 can be machined in one working cycle.

In order to bring a work piece 61 supplied on the outside for a machining by the machining unit 1 in the working room 10 the work piece changing unit 2 is provided. It has a cover 3 arranged vertically in the embodiment which is designed rotating around the rotational axis 40. The work pieces 6 to be conveyed are carried by work piece carriers 5. The work piece carriers 5 are designed, for example, fork-like and have two prongs 52 spaced apart from each other.

The work piece carrier 50 used on the inside as well as the work piece carrier 51 arranged on the outside are designed essentially identically which makes in particular lowering and lifting the work piece held respectively by them considerably easier because then the conditions are the same every time.

The rotational axis 40 is realised in a pivoting column 4. The pivoting column 4 is cleverly a part of the machine frame 19 and contributes to its static. For a rotational movement of the cover 3 a rotational drive 41 is provided which is arranged at the pivoting column above the working room at the machining unit. This is in a simple way, for example, an electromotor the control of which interacts with the machine control of the machining unit in order to carry out the rotational movement at the right time.

In FIG. 2 the machining unit with its work piece changing unit 2 according to the invention is shown in a sectional view. The cutting plane is arranged on the level of the rotational axis 40 so that the cover 3 is covered, and shown in a dashed line. The cover 3 swivels with the two work piece carriers 5 around the rotational axis 40.

The work piece carriers 5, 50, 51 are connected fixedly to the cover 3, thus the rotational movement carried out by the rotational drive 41 on the cover 3 also acts on the work piece carrier 5.

A lifting/lowering device 8 is provided for example below the cover 3 at the pivoting column 4 in order to effect a vertically orientated lifting and lowering movement 80 of the complete cover 3 and thus also of the work piece carriers 5, 50, 51 connected with it.

The invention can here be realised with regard to the design of the cover 3 in several modifications. In a first modification the cover 3 is designed in one piece, and the lifting/lowering device 8 moves the complete cover 3.

In a second modification the cover 3 is separated into several parts, in FIG. 2 for that a lower cover part 30 and an upper cover part 31 are provided. In the example according to the invention shown here only the lower cover part 30 is lifted or lowered vertically, and, of course, rotated around the rotational axis 40. Also the work piece carrier 5 is arranged at it. The upper cover part 31 remains in the same vertical position, and is swivelled simultaneous with the lower cover part 30 around the rotational axis 40. Such a design has the advantage that there are no problems in the upper part of the cover 3 (at the upper edge of the upper cover part 31) with respect to sealing or space which has to be provided for compensating the vertical movement. Here the two cover parts 30, 31 are arranged telescope-like one inside the other, in such a way that the lower cover part 30 immerses in both positions of the work piece changing unit in the vertical upward movement behind the pipe-like guide part of the upper cover part 31 arranged on the pivoting column 4. Coolant dripping from the interior wall of the working room 10 does not get to the outside via this arrangement. The lower cover part has a height of about ⅓ of the entire height of the cover 3, this can be chosen variably from ⅛ to ½ of the complete height of the cover.

The lifting/lowering device 8 is designed, for example, as a hydraulically or pneumatically driven actuating element, working cylinder or electro-motor or the like.

In the working room 10 the work piece 60 is supported on index points 15 at the supporting spot 16 exactly positioned. Above the work piece 60 a clamping unit 7 for the work piece 6, 60 is provided the clamping stamp 70 of which is in the clamping position (arrow 71) moved and orientated downward in order to hold the work piece 60 sufficiently stable and exactly positioned on the index points 15 during machining.

The clamping unit 7 is arranged at a crosshead 18 traversing the working room 10.

As shown in FIG. 1 the crosshead 18 is designed, for example, as a grid pipe construction and realised trapezoid-shaped in such a way that the crosshead 18 is supported on the pivoting column 4. The mechanic advantages in particular with respect to the stability but also to the realisation of the entire arrangement has already been pointed out.

The crosshead 18 is fixedly connected with the rest of the machine frame, and the pivoting column 4 as well as also the crosshead 18 are part of the machine frame 19, respectively.

The procedure of supplying or removing the work pieces or the change of the work pieces is as follows.

Referring to the position shown in FIG. 2 first of all the clamping unit 7 is released and moved upward against the clamping direction 71 of the clamping stamps 70. Thus the work piece 60 inside is released from its clamped position.

Then the cover 3 is lifted by the lifting/lowering device 8 (arrow 80) so that also the work piece carrier 50 located at the moment inside arrives and starts carrying the work piece 60. When the work piece carrier 50 is moved further it lifts the work piece 60 out of the index points 15, that means the work piece is released for a horizontal rotational movement. If this moment is reached the lifting movement is stopped and a rotational movement of the cover is carried out with the connected work piece carriers around the vertically orientated rotational axis 40. For that purpose the rotational drive 41 is activated. At the same time, when first of all the inside work piece 60 is conveyed out, a work piece 61 prepared on the outside work piece carrier 51 is conveyed in.

The two work pieces 60, 61 exchange their positions. If the conveyed-in work piece 6 is located in a suitable way above the index points 15, the rotational movement is stopped, and a lowering movement of the lifting/lowering device 8 follows in such a way that the now swivelled-in work piece carrier 5 deposits the work piece 6, which now has to be machined, on the index points 15. At this time already the first of all opened cover 3 is arranged again in such a way that the complete working room 10 is closed.

The work piece carrier 5 remains now below the work piece, the clamping stamp 70 moves downwards (arrow 71) and pushes the work piece 6, which is now ready positioned to be machined, on the index points 15.

Although the invention has been described by exact examples which are illustrated in the most extensive detail, it is pointed out that this serves only for illustration, and that the invention is not necessarily limited to it because alternative embodiments and methods become clear for experts in view of the disclosure. Accordingly changes can be considered which can be made without departing from the contents of the described invention.

The invention claimed is:

1. A machining unit comprising:
   a work piece changing unit, the work piece changing unit having a cover rotating around a pivoting column having a rotational axis, the cover opening and closing a working room for work piece changing processes,
   the work piece changing unit having at least two work piece carriers separated by the cover, the cover being movable up and down, the at least two work piece carriers being able to carry at least one work piece, respectively, and one work piece carrier remaining in the working room during machining of a work piece, and
   a clamping unit acting on the work piece in the working room, the clamping unit being arranged on a crosshead traversing the working room, the crosshead being supported on the pivoting column.

2. The machining unit according to claim 1, wherein the work piece carrier carries the work piece.

3. The machining unit according to claim 1, wherein the pivoting column is provided around which the cover is supported.

4. The machining unit according to claim 1, wherein a supporting spot determined by index points is provided in the working room for the work piece, and the work piece carrier deposits the work piece to be machined on the supporting spot.

5. The machining unit according to claim 1, wherein the clamping unit acting on the work piece is arranged in the working room above the work piece.

6. The machining unit according to claim 1, wherein the work piece carrier is held by the cover.

7. The machining unit according to claim 1, wherein the cover has a lifting/lowering device for the work piece carrier.

8. The machining unit according to claim 1, wherein the work piece changing unit has two, three, four or more work piece carriers each separated by the cover.

9. The machining unit according to claim 1, wherein the work piece carrier is fork-like.

10. The machining unit according to claim 1, wherein during a lifting movement of the work piece carrier a finished work piece is lifted from the supporting spot, and a subsequent rotating movement moves the finished work piece around a rotational axis of the cover out of the working room, and moves another not-machined work piece supported on another work piece carrier into the working room.

11. The machining unit according to claim 1, wherein a machining tool is provided and arranged movably relative to the work piece, wherein the machining tool is shifted within a turning circle of the work piece carrier.

12. The machining unit according to claim 11, wherein two or more machining tools are provided which independently from each other shift relative to the work piece.

* * * * *